United States Patent
Bohge et al.

(10) Patent No.: US 11,374,868 B2
(45) Date of Patent: Jun. 28, 2022

(54) COMMUNICATION SYSTEM

(71) Applicant: R3—Reliable Realtime Radio Communications GmbH, Berlin (DE)

(72) Inventors: Mathias Bohge, Berlin (DE); Florian Bonanati, Berlin (DE)

(73) Assignee: R-3 RELIABLE REALTIME RADIO COMMUNICATION GMBH, Berlin (DE)

(*) Notice: Subject to any disclaimer, the term of this patent is extended or adjusted under 35 U.S.C. 154(b) by 1080 days.

(21) Appl. No.: 15/776,373

(22) PCT Filed: Nov. 23, 2016

(86) PCT No.: PCT/EP2016/078538
§ 371 (c)(1),
(2) Date: May 15, 2018

(87) PCT Pub. No.: WO2017/089388
PCT Pub. Date: Jun. 1, 2017

(65) Prior Publication Data
US 2020/0259752 A1 Aug. 13, 2020

(30) Foreign Application Priority Data
Nov. 26, 2015 (EP) .................................... 15196499

(51) Int. Cl.
*G06F 15/173* (2006.01)
*H04L 47/24* (2022.01)
*H04L 43/0876* (2022.01)

(52) U.S. Cl.
CPC .......... *H04L 47/24* (2013.01); *H04L 43/0876* (2013.01)

(58) Field of Classification Search
CPC ..... H04L 47/24; H04L 43/0876; H04L 43/16; H04L 43/0823; H04L 67/322; H04L 69/321; H04L 43/0852
See application file for complete search history.

(56) References Cited

U.S. PATENT DOCUMENTS

| | | | |
|---|---|---|---|
| 9,001,675 B2 | 4/2015 | Wimmer et al. | |
| 2002/0107040 A1 | 8/2002 | Crandall et al. | |

(Continued)

FOREIGN PATENT DOCUMENTS

| | | |
|---|---|---|
| CN | 102282776 A | 12/2011 |
| CN | 104067255 A | 9/2014 |
| DE | 10 2012 206 529 A1 | 10/2013 |

OTHER PUBLICATIONS

Japanese Office Action dated Sep. 29, 2020 issued in a related Japanese Patent Application No. 2018-522800.

(Continued)

*Primary Examiner* — Anh Nguyen
(74) *Attorney, Agent, or Firm* — Gordon Rees Scully Mansukhani, LLP

(57) ABSTRACT

An embodiment of the invention relates to a communication node (10, 11) for a communication system (5). The embodiment is characterized by: a communication module (30), and at least one application module (21, 22), wherein the communication module is configured to transfer data signals (D2) received from another communication node of the communication system, or the contents of these data signals, to the application module, and to send data signals (D1) based on data received from the application module to said other communication node or to at least one other communication node of the communication system, wherein the communication module is configured to evaluate the received data signals and to generate a quality value (Q1 (T1), Q2(T2)) that describes the current and/or future quality (Continued)

of the data connection with respect to a previously defined maximum latency (T1, T2) that is assigned to the application module, and wherein the communication module is further configured to send a control signal (QS) to the application module if the quality value is below a given quality threshold (Q1min, Q2min) regarding the respective maximum latency that is assigned to the application module.

15 Claims, 5 Drawing Sheets

(56) References Cited

U.S. PATENT DOCUMENTS

| | | | |
|---|---|---|---|
| 2005/0059397 A1 | 3/2005 | Zhao | |
| 2011/0286350 A1 | 11/2011 | Wimmer et al. | |
| 2013/0060653 A1* | 3/2013 | Sharkey | H04L 69/321 |
| | | | 705/26.3 |
| 2016/0119959 A1* | 4/2016 | Jung | H04W 76/19 |
| | | | 455/404.1 |
| 2017/0099658 A1* | 4/2017 | Shattil | H04L 63/061 |
| 2017/0269991 A1* | 9/2017 | Bazarsky | G06F 11/1012 |

OTHER PUBLICATIONS

Y_Yasuda et al; "Implementation of A Framework S-MAX using Resource Enforcement and Change Notification for Adaptive Applications"; vol. 99; No. 32; NTT Information Sharing Platform Laboratories; Multimedia Laboratories; NTT Mobile Communications Networks, Inc.; IPSJ SIG Notes, Japan, Information Processing Society of Japan, pp. 47-52; May 6, 1999.

Chinese First Office Action dated May 7, 2021 issued by the Chinese Patent Office in related Chinese Patent Application No. 201680062269.X.

International Search Report dated Mar. 7, 2017 issued in International Application No. PCT/EP2016/078538; filed Nov. 23, 2016.

* cited by examiner

COMMUNICATION SYSTEM

The invention relates to communication systems, communication nodes and methods of operating communication systems.

BACKGROUND OF THE INVENTION

German Patent Application DE 10 2012 206 529 A1 discloses a method of operating a token-ring system where communication nodes send signals to allocated upstream communication nodes and receive signals from allocated downstream communication nodes.

OBJECTIVE OF THE PRESENT INVENTION

An objective of the present invention is to provide a method which allows operating a communication systems in a very reliable way.

A further objective of the present invention is to provide a communication system and a communication node that can be operated in a very reliable way.

BRIEF SUMMARY OF THE INVENTION

An embodiment of the invention relates to a communication node for a communication system. The communication node is characterized by a communication module and at least one application module. The communication module is configured to transfer data signals received from one or more other communication nodes of the communication system, or the contents of these data signals, to the application module, and to send data signals based on data received from the application module to at least one other communication node of the communication system. The communication module is further configured to evaluate the received data signals and to generate a quality value that describes the current and/or future quality of the data connection with respect to a previously defined maximum latency that is assigned to the application module. Moreover, the communication module is configured to send a control signal to the application module if the quality value is below a given quality threshold regarding the respective maximum latency that is assigned to the application module.

An advantage of this embodiment of the invention is that the communication module may determine quality values based on maximum latencies. The maximum latencies preferably define maximum time delays or transmission durations (and as such required arrival times) for the transmission and reception (at the remote communication nodes) of data, e.g. each data packet. As such, the communication module is capable of generating control signals that can warn the application module(s) if the quality of the data connection is insufficient to meet the requested/required time constraints.

According to a preferred embodiment, the communication node comprises at least two application modules. Preferably, an individual (module-individual) quality threshold and an individual (module-individual) maximum latency is assigned to each application module. The communication module is preferably configured to send a control signal to each of the application modules for which the assigned quality threshold exceeds the quality value for the respective maximum latency. As such, each application module can take individual measures if and when their (time/delay-related) quality demands are not met.

The communication system is preferably a token-ring system and the communication nodes are preferably broadcast-type communication nodes.

According to a further preferred embodiment, the data signals are encoded data packets. The communication module is preferably configured to decode the received data packets and to determine the quality value based on, or at least also based on, the error rate of said received and decoded data packets.

Further, the communication module is preferably configured to evaluate the error rates of presently received data packets as well as of a plurality of previously received data packets, and to estimate or predict the quality of the future data connection with respect to the maximum latency that is assigned to the respective application module. The communication module is preferably configured to generate the control signal based on a quality value that describes the estimated quality of the future data connection.

According to a further preferred embodiment, the at least one application module is configured to send a stop request to the communication module in response to receiving said control signal, wherein said stop request indicates to the communication module that—with respect to said at least one application module—no subsequent data signal must be exchanged with any other communication module of the communication system.

The at least one application module may be configured to carry out the following steps in connection with, or upon, the generation of the stop request: starting a timer and sending a re-start request to the communication module in response to the expiration of the timer.

The communication module is preferably configured to re-establish the data transmission with at least one other communication node of the communication system with respect to said at least one application module upon reception of the re-start request. The re-establishing of the data transmission preferably includes: sending data signals based on data received from the application module to at least one other communication node of the communication system, receiving data signals from at least one other communication node of the communication system, and transferring the received data signals or the contents of these data signals to the application module.

According to another preferred embodiment, the at least one application module may be configured to send a parameter request to the communication module in response to receiving the control signal, wherein said parameter request indicates to the communication module that the communication module is instructed to proceed with exchanging data signals with other communication nodes based on a modified parameter set that includes a modified quality threshold and/or a modified maximum latency value.

The communication module may be configured to carry out the following steps upon reception of the parameter request: evaluating the received data signals and generating an updated quality value that describes the current and/or future quality of the data connection with at least one other communication node based on the requested parameters of said received parameter set, sending a new control signal to the application module if said updated quality value is below said modified quality threshold of the modified parameter set, and sending a confirmation to the application module if said updated quality value exceeds the modified quality threshold of said modified parameter set.

As mentioned above, the communication node preferably comprises at least two application modules, to each of which an individual quality threshold and an individual maximum latency is assigned. In this case, the communication module is preferably configured to send a control signal to each of the application modules for which the assigned quality threshold exceeds the quality value for the respective maximum latency.

Furthermore, the communication module may be configured to send its quality values and latency values that indicate the respective maximum latencies, to at least one other communication node of the communication system and to evaluate quality and latency values that are received from at least one other communication node of the communication system. Further, the communication module may be configured to determine its quality values in combination with the corresponding maximum latencies based on, or at least also based on, quality values and latencies that are received from one or more of the other communication nodes of the communication system.

The communication module may be also configured to measure the electromagnetic radiation on the currently used communication channel, preferably in time slots where no data signals are transmitted between communication nodes of the communication system, and to determine an interference value that indicates the amount of electromagnetic radiation.

The communication module may be further configured to determine the quality value with respect to the corresponding maximum latency based on, or at least also based on, the interference value.

According to another embodiment, the communication module may be configured to measure predefined characteristics of the electromagnetic radiation on the currently used communication channel, preferably in time slots where no data signals are transmitted between communication nodes of the communication system, and to derive an interference value from said measured characteristics of said electromagnetic radiation.

The communication module may be further configured to determine the quality values with respect to the corresponding maximum latencies based on, or at least also based on, the interference value.

Furthermore, the communication module may be configured to send its interference value to at least one other communication node of the communication system, and to evaluate interference values that are received from at least one other communication node of the communication system.

The communication module may be further configured to determine its quality value or values with respect to the defined maximum latency or latencies based on, or at least also based on, interference values that are received from one or more of the other communication nodes of the communication system.

According to a further preferred embodiment, the communication node may comprise a processor and a memory. The memory preferably stores a control software module which—after activation—programs the processor to function as a communication module as defined above, and at least one application software module which—after activation—programs the processor to function as an application module as defined above.

The control software module is preferably assigned to the physical layer or the data link layer according to the Open Systems Interconnection model, OSI-model.

The at least one application software module is preferably assigned to the application layer according to the OSI-model.

A further embodiment of the invention relates to a communication system that comprises at least two communication nodes as described above.

A further embodiment of the invention relates to a method of operating a communication node in a communication system. A communication module of the communication node transfers data signals received from another communication node of the communication system, or the contents of these data signals to an application module of the communication node, and sends data signals based on data received from the application module to said other communication node or to at least one other communication node of the communication system. The communication module evaluates the received data signals and generates a quality value that describes the current and/or future quality of the data connection with respect to a given maximum latency. The communication module sends a control signal to the application module if the quality value for the given maximum latency is below a given threshold that is assigned to the application module.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
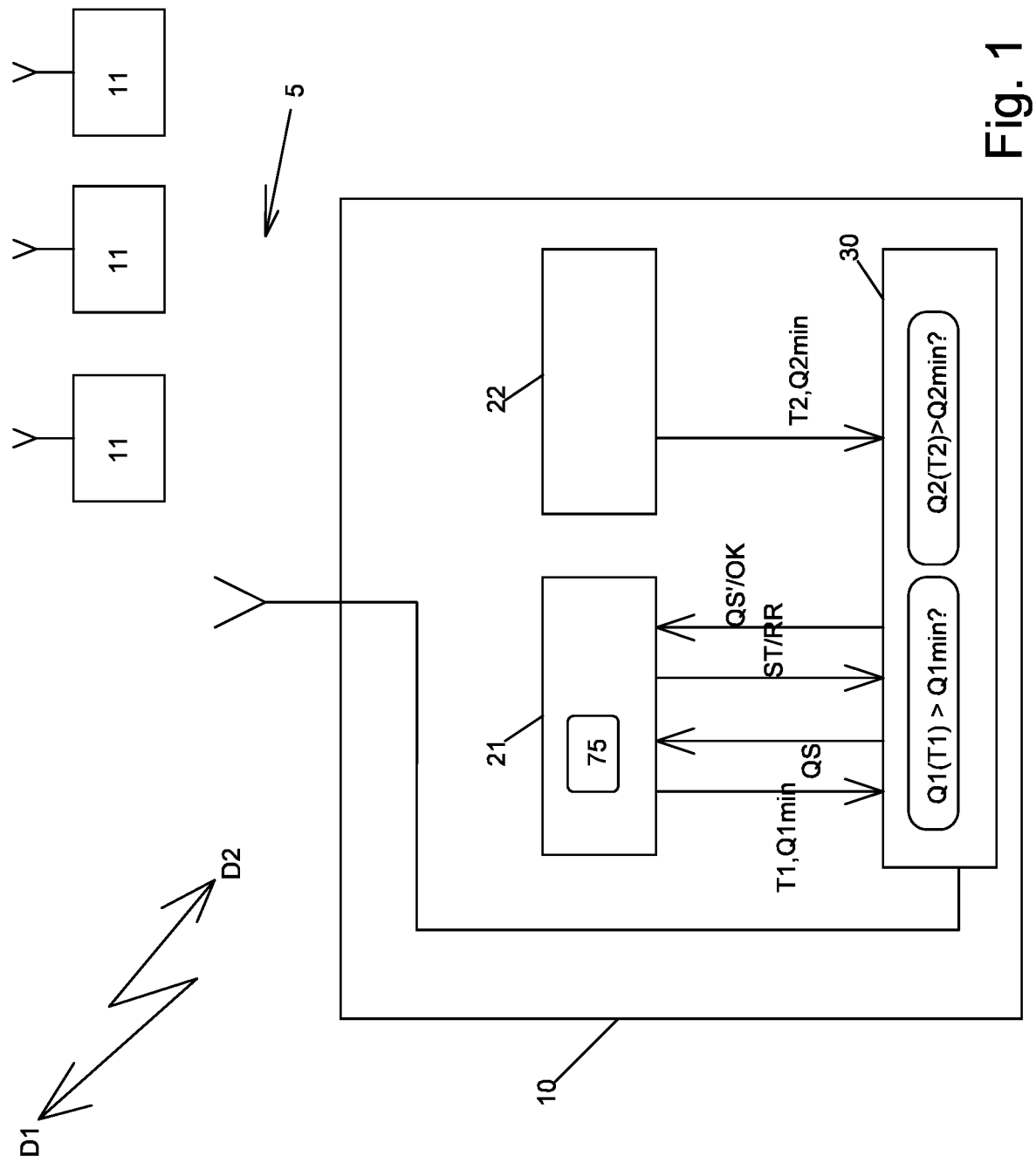
FIGS. 1-4 show exemplary embodiments of a token-ring communication system that comprises broadcast-type communication nodes.

FIG. 1 shows a first exemplary embodiment of a communication system 5 that comprises a plurality of broadcast-type communication nodes. The communication nodes are designated by reference numerals 10 and 11 in FIG. 1. The communication nodes 10 and 11 may be identical.

The communication module 10 comprises a first application module 21, a second application module 22, and a communication module 30. The communication module 30 is in charge of managing the data communication with the corresponding application modules of the other communication nodes 11.

To this end, the communication module 30 receives data signals D2 from the communication nodes 11 of the communication system 5 and transfers the contents of these data signals to the respective application modules, i.e. to the application modules 21 and 22 to which the content of the received data signals is addressed.

In order to enable a data flow in the opposite direction, the communication module 30 receives data from the application modules 21 and 22 and generates data signals D1 which are then sent to the other communication nodes 11 of the communication system 5.

The communication system 5 preferably forms a token-ring system wherein each communication node directly or indirectly—i.e. via one or more other communication nodes that function as relay nodes—sends data signals to an allocated downstream communication node and receives data signals from an allocated upstream communication node. The communication nodes 10 and 11 are preferably broadcast-type communication nodes.

The communication module 30 of the communication node 10 as well as the communication modules of the other communication nodes 11 are further configured to monitor the quality of the data connection and to generate quality values Q1(T1) and Q2(T2) that indicate the quality of the current communication or the estimated quality of the future communication.

The quality values Q1(T1) and Q2(T2) that are determined by the communication module 30 consider tolerable latencies (or tolerable time delays), preferably application-individually with respect to the communication of each application module, i.e. the first application module 21 and the second application module 22. The maximum latencies define maximum time delays or transmission durations and as such implicitly required arrival times for the transmission and reception of data, preferably each data packet, at the allocated remote communication node(s) 11.

The application-individual latency values that application-individually indicate the respective maximum latencies, are designated in FIG. 1 by reference signs T1 and T2, respectively.

The quality values Q1(T1) and Q2(T2) may be determined as follows:

Q1(T1)=1 if all data provided by application module 21 can be transmitted in compliance with the time restraints, or within the requested time interval, defined by latency value T1 and Q1(T1)=0 if all data provided by application module 21 cannot be transmitted in compliance with the time restraints, or within the requested time interval, defined by latency value T1, because the communication is disturbed or interrupted.

Q2(T2)=1 if all data provided by application module 22 can be transmitted in compliance with the time restraints, or within the requested time interval, defined by latency value T2 and Q2(T2)=0 if all data provided by application module 22 cannot be transmitted in compliance with the time restraints, or within the requested time interval, defined by latency value T2, because the communication is disturbed or interrupted.

A quality threshold Q1min and Q2min is individually assigned to each of the application modules 20 and 21, respectively. The quality thresholds Q1min and Q2min may differ.

In case of binary quality values as described above, the quality thresholds Q1min and Q2min may be equal, for instance:

Q1min=Q2min=0.5

Instead of binary quality values, numerical values can be calculated that estimate or predict the likelihood of a successful data transmission within the given maximum latencies. For instance, percentages can be calculated where a value of 0% predicts no chance of latency-compliant transmission and a value of 100% predicts certainty of latency-compliant transmission.

To this end, the communication module 30 may evaluate the transmission rates, bit error rates and/or durations of interruptions in the past in order to predict the future communication quality and calculate the respective numerical quality values.

For instance, the values Q1 and Q2 may be calculated as follows:

$$Q(T) = \begin{cases} 1, & \text{if } \frac{packetsize}{B\log_2(S/N)} + t_{start} < T \\ 0, & \text{if } \frac{packetsize}{B\log_2(S/N)} + t_{start} \geq T \end{cases},$$

where B is the system bandwidth, S is the received signal strength of data signal D, N is the noise and tstart is the time period from the packet generation to the start of the packet transmission.

An according future communication quality value Q' at time T might be determined by calculating a weighted average over the last n available channel quality values, for example, if n=4, as follows:

$$Q'(T)=0.4*Q(T)+0.3*Q(T-1)+0.2*Q(T-2)+0.1*Q(T-3).$$

In the embodiment shown in FIG. 1, it is assumed that the quality thresholds Q1min and Q2min as well as the latency values T1 and T2 are transferred from the application modules 21 and 22 to the communication module 30. As such, the application modules 21 and 22 are capable of modifying their quality demands if necessary, by sending new or updated latency values and/or quality thresholds (for instance in cases of non-binary quality values).

During the ongoing communication with the other communication nodes 11, the communication module 30 analyzes the data traffic and generates the quality values Q1(T1) and Q2(T2) as discussed above with respect to each of the application modules 21 and 22 and the respective maximum latencies T1 and T2. As such, the communication module 30 takes into account that the transmission of data signals from the application modules 21 and 22 to the other communication nodes 11 may not or should not exceed the tolerable latency for the respective application module 21 and 22.

The communication module 30 then compares the application-individual quality values Q1(T1) and Q2(T2) with the application-individual quality thresholds Q1min and Q2min that are provided by the application modules 21 and 22. If any of the quality values Q1(T1) or Q2(T2) is below the application-individual quality threshold Q1min and Q2min, the communication module 30 sends a control signal QS to the respective application module 21 or 22.

In the illustrated example, it is assumed that the quality value Q2(T2) exceeds the required minimum quality threshold Q2min. Therefore, the communication module 30 can proceed with the communication with respect to the second application module 22.

In the illustrated example, it is further assumed that the quality value Q1(T1) fails to reach its quality threshold Q1min. In this case, the communication module 30 is unable to send data signals on behalf of the first application module 21, at least not in compliance with the time restraints imposed by the maximum latency value T1.

Therefore, the communication module 30 generates a control signal QS and transmits the control signal QS to the first application module 21. Upon receipt of the control signal QS, the first application module 21 is aware that the communication with the other communication nodes 11, in particular with the first application modules of the other communication nodes 11, is disturbed or compromised and that its data signals cannot be sent as planned.

In the illustrated example, the first application module 21 comprises a timer 75. After receiving the control signal QS, the first application module 21 sends a stop request ST to the communication module 30. The stop request ST indicates that the communication module 30 is instructed to stop data traffic with respect to the first application module 21.

Further, the first application module 21 starts its timer 75 for a given period. When the timer 75 expires, the first application module 21 sends a re-start request RR to the communication module 30. Upon receipt of the re-start request RR, the communication module 30 re-establishes the data transmission with the other communication nodes 11 with respect to the first application module 21.

The step of re-establishing the data transmission preferably includes: sending data signals based on data received from the first application module 21 to the other communication nodes 11; and receiving data signals from the other communication nodes 11 and transferring the received data signals or the contents of these data signals to the first application module 21.

During the resumption of the data connection or thereafter, the communication module 30 also resumes monitoring the quality of the data connection with respect to the first application module 21: If the quality value Q1(T1) still fails to reach its quality threshold Q1min, a new control signal QS' may be generated and the communication may be paused again as discussed above. If the quality value Q1(T1) reaches or exceeds the quality threshold Q1min, a confirmation signal OK may be sent to the first application module 21 in order to confirm that data can be sent and received in compliance with the requested maximum latency T1.

The second application module 22 may react to an incoming control signal QS in the same way as discussed above with reference to the first application module 21, or differently. Hereinafter, with reference to FIG. 2, it is assumed that the second application module 22 takes other measures to cope with quality issues.

Figure 2:
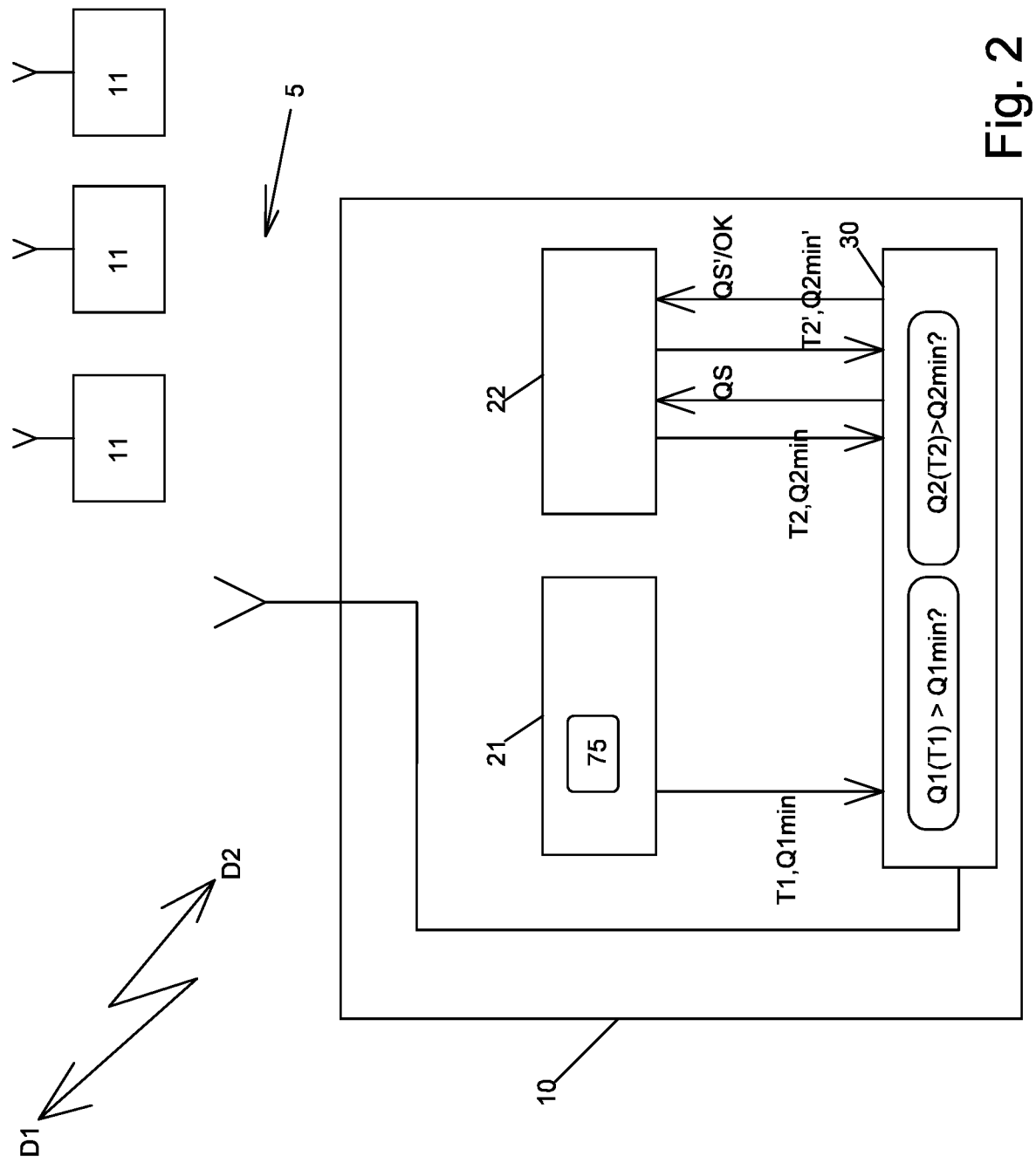

FIG. 2 shows the communication node 10 of FIG. 1 in case that the communication module 30 detects an insufficient quality of the data connection with respect to the second application module 22 and generates the respective control signal QS.

Upon receipt of the control signal QS, the second application module 22 sends a parameter request to the communication module 30. The parameter requests indicates to the communication module 30 that the communication module 30 is instructed to proceed with exchanging data signals with other communication modules 11, however, based on a modified parameter set that includes a modified, preferably reduced, quality threshold Q2min' and a modified, preferably extended, maximum latency value T2'.

After receiving the new parameter set, the communication module 30 evaluates the received data signals and generates an updated quality value that describes the current quality of the data connection in view of the requested new latency value T2'. Depending on the outcome of this analysis, the communication module 30 either sends a new control signal QS' (if the updated quality value is still below the modified quality threshold Q2min') or a confirmation signal OK (if the updated quality value exceeds the modified quality threshold Q2min') to the second application module 22.

Figure 3:
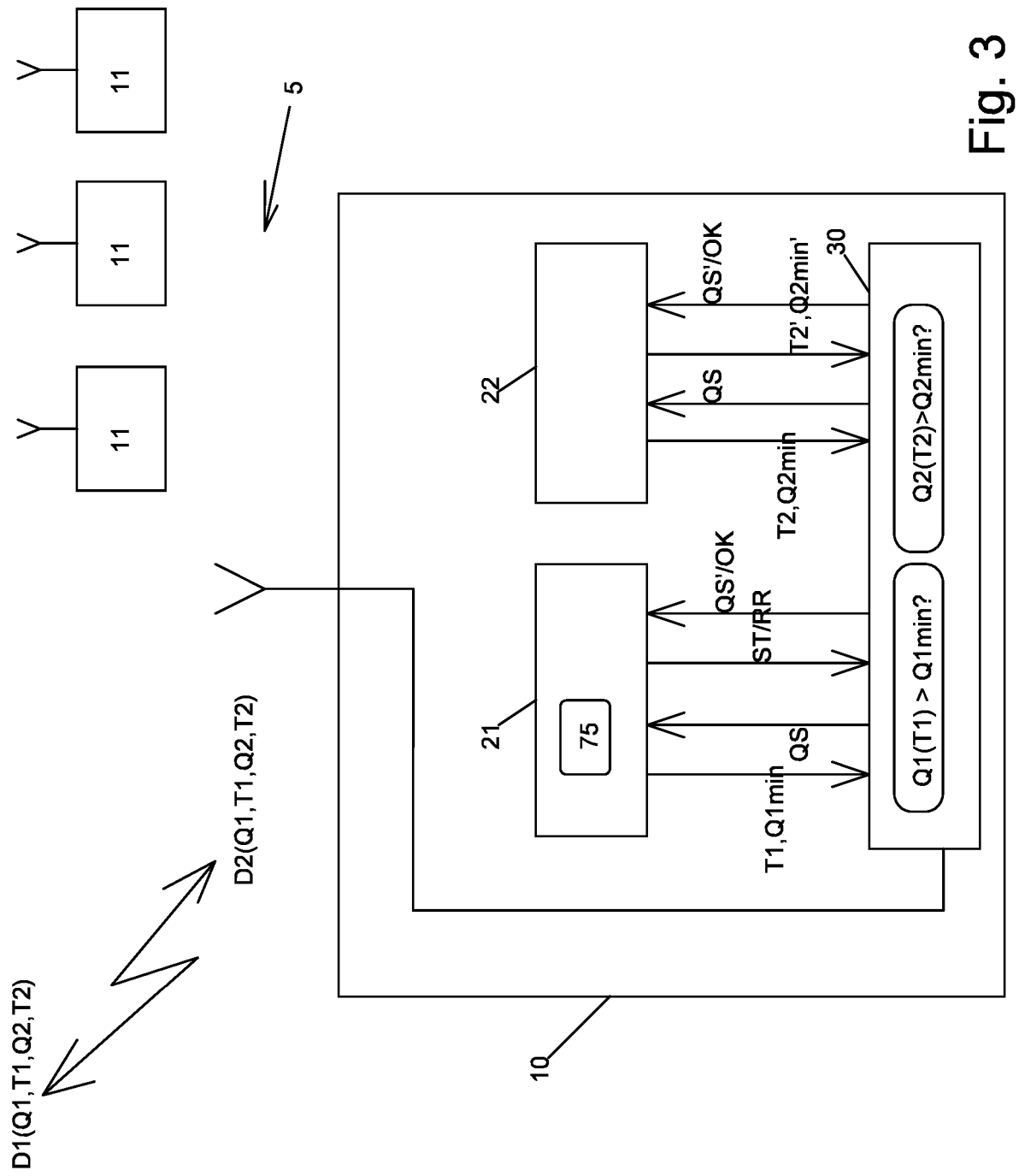

FIG. 3 shows an exemplary embodiment of a communication system 5 where the communication nodes 10 and 11 exchange their quality values Q1 and Q2 and latency values T1 and T2 in order to enable a calculation of quality values based on, or at least also based on, quality values and latencies that are received from other communication nodes of the communication system 5.

In the illustrated example, the communication module 30 receives data signals D2(Q1,T1,Q2,T2) that comprise the quality values Q1 and Q2 and the latency values T1 and T2 presently assigned to the respective application modules of at least one of the other communication nodes 11 or preferably of all of the other communication nodes 11.

In a corresponding manner, the communication module 30 of the communication node 10 generates and transmits data signals D1(Q1,T1,Q2,T2) that indicate the quality values Q1 and Q2 and the latency values T1 and T2 that are presently assigned to the application modules 21 and 22 of the communication node 10. Further, the communication module 30 may forward the quality values Q1 and Q2 and the latency values T1 and T2 that were previously received from the other communication nodes 11 in order to transmit complete sets of quality and latency values that refer to each of the communication nodes of the communication system 5.

Furthermore, the communication module 30 of the communication node 10 may measure the radiation or predefined characteristics of the electromagnetic radiation on the currently used communication channel, preferably in time slots where no data signals are transmitted between the communication nodes 10 and 11, and determine an interference value I that indicates the amount of electromagnetic radiation.

For instance, the communication module 30 may measure the interference value I by using the following formula:

$$I = \int_{fmin}^{fmax} P(f) df$$

wherein fmax(C) the upper end of the frequency band of the respective communication channel, fmin(C) the lower end of the frequency band of the respective communication channel, and P(f) the radiation density.

In case of a time domain multiplexing system, the interference value I can be obtained by using the following formula:

$$I = \int_{tmin}^{tmax} P(t) dt$$

wherein tmax the end of the time slot assignment of the respective communication channel, tmin the beginning of the time slot assignment of the respective communication channel, and P(t) the radiation density.

If an interference value I is calculated or measured, the communication module 30 may also determine the quality values Q1 and Q2—with respect to the corresponding maximum latency—based on, or at least also based on, the interference value I. For instance, the values Q1 and Q2 may be calculated as follows:

$$Q(T) = \begin{cases} 1, & \text{if } \frac{packetsize}{B\log_2(S/[N+I])} + t_{start} < T \\ 0, & \text{if } \frac{packetsize}{B\log_2(S/[N+I])} + t_{start} \geq T \end{cases},$$

where B is the system bandwidth, S is the received signal strength of data signal D, N is the noise and tstart is the time period from the packet generation to the start of the packet transmission.

Figure 4:
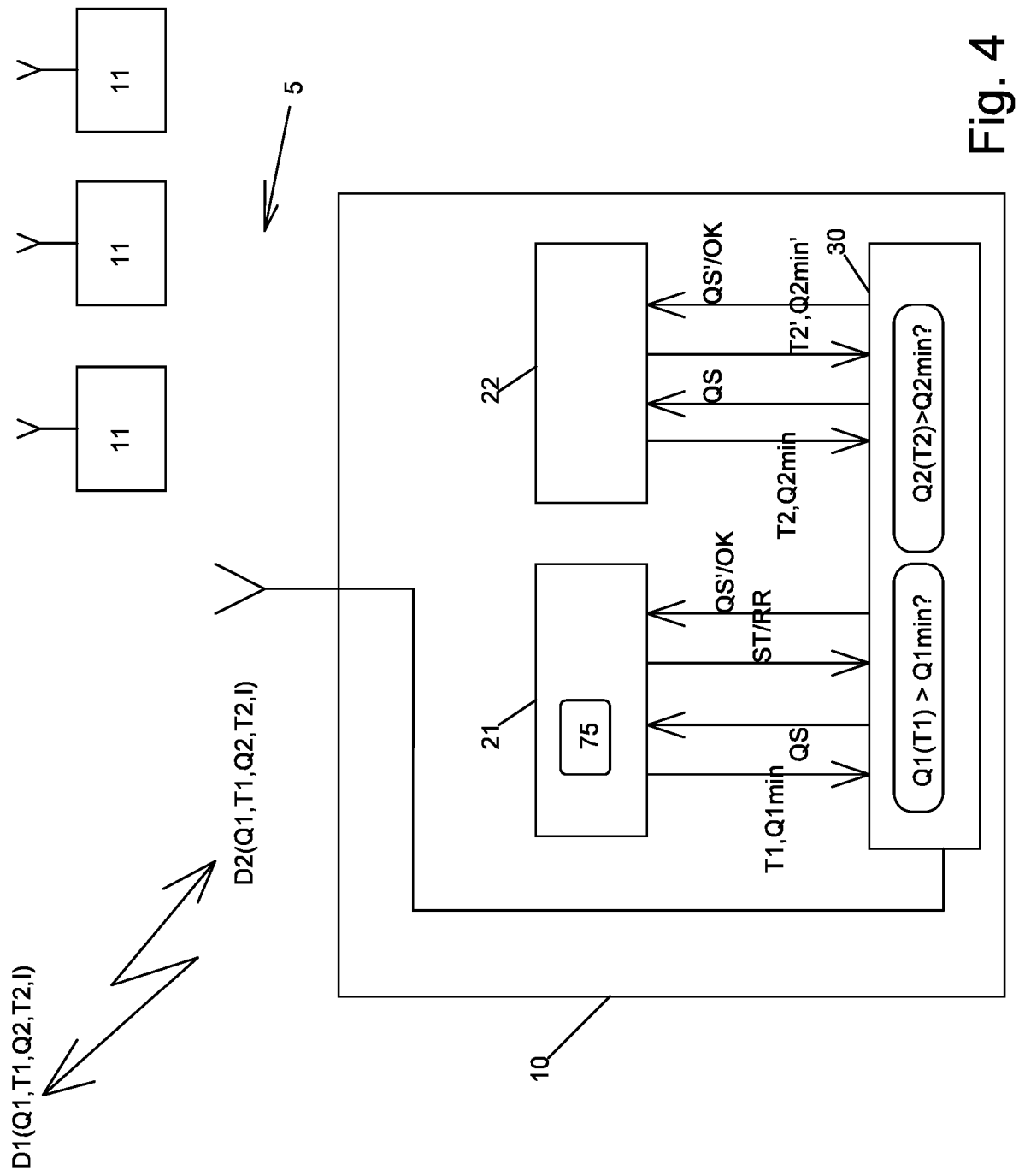

FIG. 4 shows an exemplary embodiment of a communication system 5 where the communication nodes 10 and 11 exchange their quality values Q1 and Q2, their latency values T1 and T2 and their interference values I in order to enable a calculation of quality values based on, or at least also based on, quality values, latencies values and interference values that were received from other communication nodes of the communication system 5.

In the illustrated example, the communication module 30 receives data signals D2(Q1,T1,Q2,T2,I) that comprise quality values Q1 and Q2 and latency values T1 and T2 presently assigned to the respective application modules of at least one of the other communication nodes 11 or preferably of all of the other communication nodes 11. The data signals D2(Q1,T1,Q2,T2,I) further comprise interference values I that were previously determined by at least one of the other communication nodes 11 or preferably by all of the other communication nodes 11.

In a corresponding manner, the communication module 30 of the communication node 10 generates and transmits data signals D1(Q1,T1,Q2,T2,I) that indicate the quality values Q1 and Q2 and the latency values T1 and T2 that are presently assigned to the application modules 21 and 22 of the communication node 10 as well as the interference value I determined by the communication module 30. Further, the communication module 30 may also forward the quality values Q1 and Q2, the latency values T1 and T2 as well as the interference values that were previously received from the other communication nodes 11 in order to transmit complete sets of quality and latency values as well as interference values that refer to each of the other communication nodes of the communication system 5.

Figure 5:
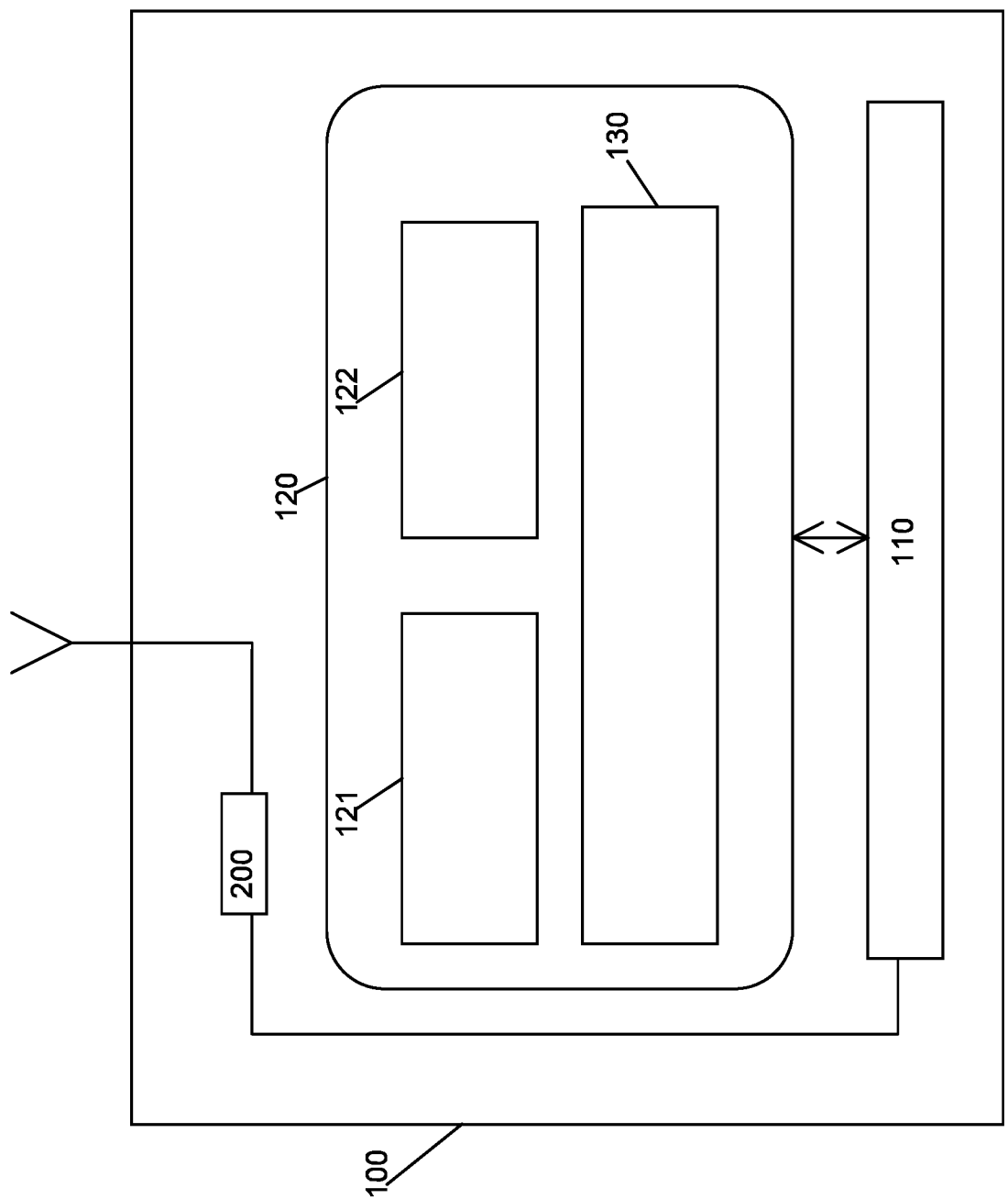
FIG. 5 shows an exemplary embodiment of a communication node in further detail.

FIG. 5 shows an exemplary embodiment of a communication node 100 that can form any of the communication nodes 10 and 11 in FIGS. 1-4. The communication node 100 comprises a processor 110, a memory 120, and a transceiver 200.

The memory 120 stores a control software module 130 which—after activation—programs the processor 110 to function as a communication module 30 as described above in connection with the communication node 10 in FIGS. 1-4.

The memory 120 further stores two application software modules 121 and 122 which—after activation—program the processor 110 to function as application modules 21 and 22, respectively, as described above in connection with the embodiments shown in FIGS. 1-4.

The control software module 130 is preferably assigned to the physical layer or the data link layer according to the Open Systems Interconnection model, OSI-model.

The application software modules 121 and 122 are preferably assigned to the application layer according to the OSI-model.

The invention claimed is:

1. A communication node (10, 11) for a communication system (5), characterized by:
a processor programmable to function as a communication module and at least one application module;
wherein the communication module is configured to transfer data signals (D2) received from another communication node of the communication system, or contents of these data signals, to the application module, and to send data signals (D1) based on data received from the application module to at least one other communication node of the communication system,
wherein the communication module is configured to evaluate the received data signals and to generate a quality value (Q1(T1), Q2(T2)) that describes a current and/or a future quality of a data connection with respect to a previously defined maximum latency (T1, T2) that is assigned to the application module,
wherein the communication module is further configured to send a control signal (QS) to the application module if the quality value is below a given quality threshold (Q1 min, Q2 min) regarding the previously defined maximum latency that is assigned to the application module,
said at least one application module is configured to send a parameter request to the communication module in response to receiving said control signal,
wherein said parameter request indicates to the communication module that the communication module is instructed to proceed with exchanging data signals with other communication modules based on a modified parameter set that includes a modified quality threshold (Q2 min') and/or a modified maximum latency value (T2'),
the communication module is configured to carry out the following steps upon reception of the parameter request:
evaluating the received data signals and generating an updated quality value that describes current and/or future quality of the data connection with respect to requested parameters of a received parameter set,
sending a new control signal to the application module if said updated quality value is below said modified quality threshold of the modified parameter set, and
sending a confirmation to the application module if said updated quality value exceeds the modified quality threshold of said modified parameter set.

2. The communication node of claim 1, characterized in that
said data signals are encoded data packets, and
the communication module is configured to decode the received data packets and to determine the quality value based on, or at least also based on, an error rate of said received and decoded data packets.

3. The communication node of claim 1, characterized in that
the communication module is configured to evaluate error rates of presently received data packets as well as of a plurality of previously received data packets, and to estimate or predict the quality of the future data connection with respect to the maximum latency assigned to the application module, and
the communication module is further configured to generate said control signal based on a quality value that describes the estimated quality of the future data connection.

4. The communication node of claim 1, characterized in that
said at least one application module is configured to send a stop request (ST) to the communication module in response to receiving said control signal,
wherein said stop request indicates to the communication module that—with respect to said at least one application module—no subsequent data signal must be exchanged with any other communication module of the communication system.

5. The communication node of claim 4, characterized in that
- said at least one application module is configured to carry out the following steps in connection with, or upon, the generation of the stop request: starting a timer (75) and sending a re-start request (RR) to the communication module in response to an expiration of said timer, and
- said communication module is configured to re-establish the data transmission with at least one other communication node of the communication system with respect to said at least one application module upon reception of the re-start request.

6. The communication node of claim 1, characterized in that
- the communication node comprises at least two application modules, to each of which an individual quality threshold and an individual maximum latency is assigned, and
- the communication module is configured to send a control signal to each of the application modules for which the assigned quality threshold exceeds the quality value for the respective maximum latency.

7. The communication node of claim 1, characterized in that
- the communication module is configured to send its quality values and latency values that indicates the respective maximum latencies, to at least one other communication node of the communication system and to evaluate quality and latency values that are received from at least one other communication node of the communication system, and
- wherein the communication module is further configured to determine its quality values in combination with the corresponding maximum latencies based on, or at least also based on, quality values and latencies that are received from one or more of the other communication nodes of the communication system.

8. The communication node of claim 1, characterized in that
- the communication module is configured to measure the electromagnetic radiation on the currently used communication channel, preferably in time slots where no data signals are transmitted between communication nodes of the communication system, and to determine an interference value (I) that indicates the amount of electromagnetic radiation, and
- the communication module is further configured to determine the quality value with respect to the corresponding maximum latency based on, or at least also based on, the interference value.

9. The communication node of claim 1, characterized in that
- the communication module is configured to measure predefined characteristics of electromagnetic radiation on the currently used communication channel, preferably in time slots where no data signals are transmitted between communication nodes of the communication system, and to derive an interference value from said measured characteristics of said electromagnetic radiation, and
- the communication module is further configured to determine the quality values with respect to the corresponding maximum latencies based on, or at least also based on, the interference value.

10. The communication node of claim 8, characterized in that
- the communication module is configured to send its interference value to at least one other communication node of the communication system, and to evaluate interference values that are received from at least one other communication node of the communication system, and
- wherein the communication module is further configured to determine its quality value or values with respect to the defined maximum latency or latencies based on, or at least also based on, interference values that are received from one or more of the other communication nodes of the communication system.

11. The communication node of claim 1, characterized in that the communication node comprises a processor (110) and a memory (120) that stores
- a control software module (130) which—after activation—programs the processor to function as a communication module as defined above, and
- at least one application software module (121, 122) which—after activation—programs the processor to function as an application module as defined above,
- wherein said control software module is assigned to the physical layer or the data link layer according to the Open Systems Interconnection model, OSI-model, and
- wherein said at least application software module is assigned to the application layer according to the OSI-model.

12. Communication system comprising at least two communication nodes, characterized in that at least one of the communication nodes is the communication node of claim 1.

13. The communication node of claim 9, characterized in that
- the communication module is configured to send its interference value to at least one other communication node of the communication system, and to evaluate interference values that are received from at least one other communication node of the communication system, and
- wherein the communication module is further configured to determine its quality value or values with respect to the defined maximum latency or latencies based on, or at least also based on, interference values that are received from one or more of the other communication nodes of the communication system.

14. A communication node (10, 11) for a communication system (5), comprising:
- a processor programmable to function as a communication module and at least one application module;
- wherein the communication module is configured to transfer data signals (D2) received from another communication node of the communication system, or contents of these data signals, to the application module, and to send data signals (D1) based on data received from the application module to at least one other communication node of the communication system,
- wherein the communication module is configured to evaluate the received data signals and to generate a quality value (Q1(T1), Q2(T2)) that describes current and/or future quality of data connection with respect to a previously defined maximum latency (T1, T2) that is assigned to the application module,
- wherein the communication module is further configured to send a control signal (QS) to the application module if the quality value is below a given quality threshold (Q1 min, Q2 min) regarding the previously defined maximum latency that is assigned to the application module, the communication module is configured to measure electromagnetic radiation on a currently used communication channel, preferably in time slots where no data signals are transmitted between communication nodes of the communication system, and to determine an interference value (I) that indicates N amount of electromagnetic radiation, and the communication module is further configured to determine the quality value with respect to the corresponding maximum latency based on, or at least also based on, the interference value.

15. A communication node (10, 11) for a communication system (5), comprising:

a processor programmable to function as a communication module and at least one application module;

wherein the communication module is configured to transfer data signals (D2) received from another communication node of the communication system, or contents of these data signals, to the application module, and to send data signals (D1) based on data received from the application module to at least one other communication node of the communication system, wherein the communication module is configured to evaluate the received data signals and to generate a quality value (Q1(T1), Q2(T2)) that describes current and/or future quality of data connection with respect to a previously defined maximum latency (T1, T2) that is assigned to the application module, wherein the communication module is further configured to send a control signal (QS) to the application module if the quality value is below a given quality threshold (Q1 min, Q2 min) regarding the previously defined maximum latency that is assigned to the application module, the communication module is configured to measure predefined characteristics of electromagnetic radiation on a currently used communication channel, preferably in time slots where no data signals are transmitted between communication nodes of the communication system, and to derive an interference value from said measured characteristics of said electromagnetic radiation, and the communication module is further configured to determine the quality values with respect to the corresponding maximum latencies based on, or at least also based on, the interference value.

* * * * *